United States Patent [19]
Kessler

[11] 3,833,294

[45] Sept. 3, 1974

[54] AUTOMATIC SEARCHING FILM READER

[75] Inventor: Lawrence P. Kessler, Penfield, N.Y.

[73] Assignee: Eastman Kodak Company, Rochester, N.Y.

[22] Filed: Nov. 2, 1972

[21] Appl. No.: 303,292

[52] U.S. Cl.......................... 353/27, 353/78, 353/99
[51] Int. Cl. ............................................ G03b 23/08
[58] Field of Search .......... 350/160 LC; 355/45, 65, 355/66; 353/26, 27, 122, 121, 94, 99, 78, 49; 353/82

[56] References Cited
FOREIGN PATENTS OR APPLICATIONS
721,721   12/1931   France.................................. 353/94

*Primary Examiner*—Harry N. Haroian

[57] ABSTRACT

An apparatus for rapidly recording and storing a series of images from a transient source of information. A series of erasable image storage devices are provided upon which a plurality of desired pieces of information from the transient source can be rapidly recorded and stored. The transient source of information is scanned and the images of the desired pieces of information as detected are relayed via an automatically controlled multi-positional mirror to the initial available storage device for recording for subsequent viewing and optional printing without interrupting the action of the transient information source.

7 Claims, 6 Drawing Figures

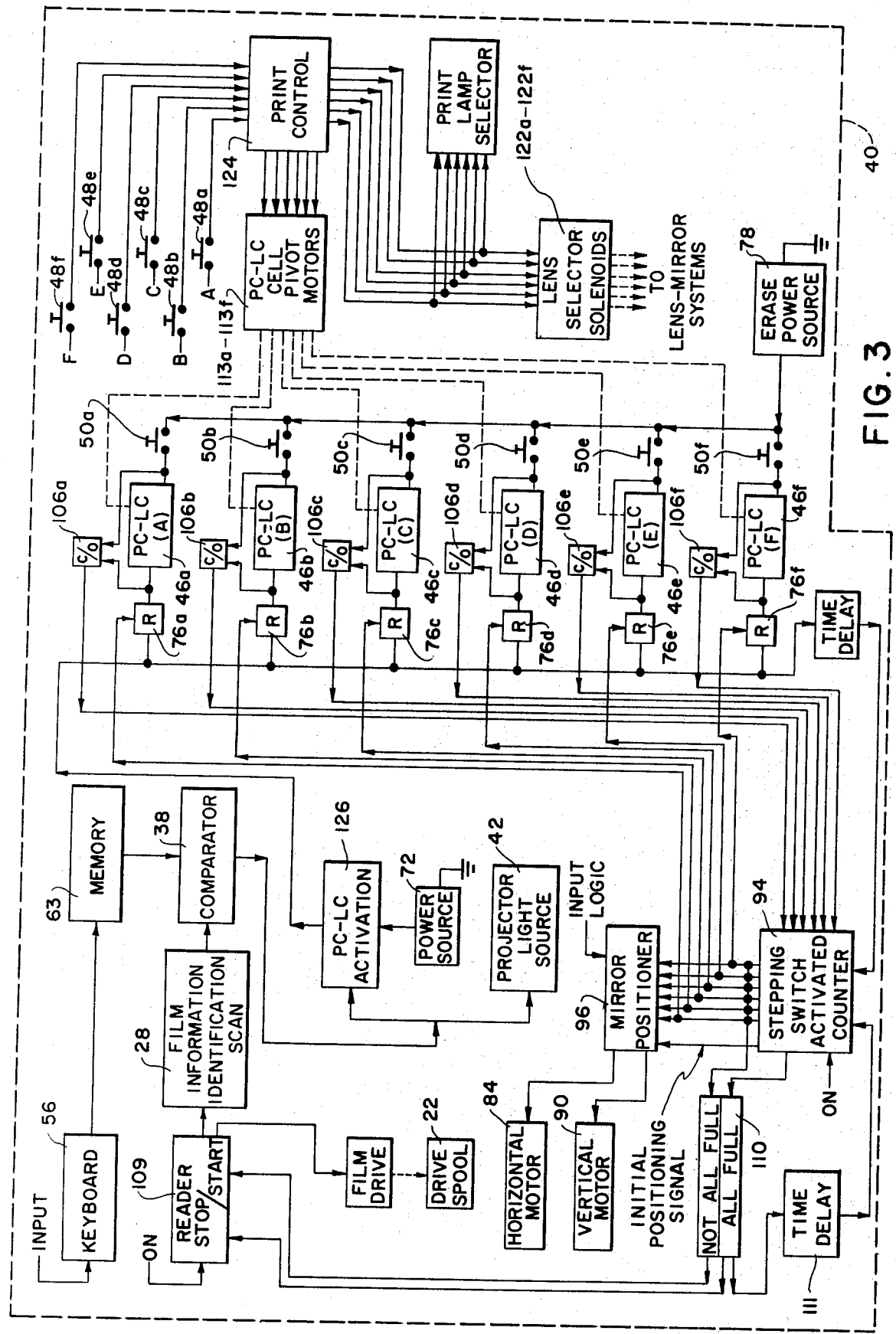

AUTOMATIC SEARCHING FILM READER

CROSS REFERENCE TO RELATED APPLICATIONS

Reference is hereby made to commonly assigned, co-pending U.S. Pat. application No. 276,195, entitled METHOD AND APPARATUS FOR CAPTURE AND RETENTION OF A TRANSIENT IMAGE, filed in the name of Homer A. Smith, Jr. on July 28, 1972.

BACKGROUND OF THE INVENTION

1. Field of the Invention

This invention is concerned with the recording and storing of images from a transient source of information and more particularly to an apparatus for rapidly recording and storing a multiplicity of pieces of desired information from a transient source on a series of erasable image storage devices for subsequent viewing and optional printing without interrupting the operation of the transient source.

2. Description of the Prior Art

In order to save space in information storage, vast volumes of material have been placed on microfilm, microfiche and similar size reducing image bearing media. To rapidly recover stored information, automatic searching film readers, such as shown in the commonly-assigned U.S. Pat. No. 3,290,987, in the name of James et al, have been developed to speed retrieval of such information. Prior known film readers are limited in they they require stopping the image bearing medium and positioning the desired image for viewing.

A new technique for retrieval of stored information which does not require the time involved in stopping and positioning the information bearing medium is described in the commonly assigned U.S. Pat. application Ser. No. 276,195 to Homer A. Smith, Jr. In this application a photoconductor-liquid crystal display panel is used to capture and store a desired image to be viewed from a transient source without the necessity of stopping such transient source. The limitation of the arrangement of this application with regard to the retrieval of images from reduced image bearing media (which limitation applies equally to other known prior film readers) is that only one image or piece of information can be viewed at one time. This limitation is most restrictive in the retrieval of information in which the pieces of information are required to be compared with similar pieces of information, such as in the case of comparing medical x-rays or identification photographs. As a result, information storage for this class of documents has not heretofore taken full advantage of size reduction techniques by placement on size reducing media.

SUMMARY OF THE INVENTION

In view of the above, it is an object of the invention to provide an apparatus for rapidly recording and storing a series of images from a transient source of information without interrupting the action of the transient source.

It is further the object of this invention to permit rapid retrieval of a series of information bearing images from a moving information bearing medium by recording the images in turn in a series of erasable image storage devices.

Still another object of the invention is to provide an automatic searching film reader which can select desired images from a rapidly moving filmstrip and record and store such desired images on a series of erasable temporary image storage devices without interrupting a movement of the filmstrip.

Accordingly, an information searching arrangement scans a transient source of information such as a moving strip of film and detects desired images thereon. The images are in turn projected onto a multi-positional mirror device which is controlled automatically to reflect the desired image to particular activated available image storage device in a series of image storage devices for recording the image thereon for subsequent viewing and optional printing without necessitating the interruption of the movement of the transient source. The image storage devices are photoconductive-liquid crystal sandwich display panels of the storage type.

BRIEF DESCRIPTION OF THE DRAWINGS

FIG. 3 is a logic diagram showing the mode of operation for the automatic searching film reader for correctly positioning the multi-positional mirror and activating the proper photoconductor-liquid crystal display panel;

DESCRIPTION OF THE PREFERRED EMBODIMENT

Figure 1:
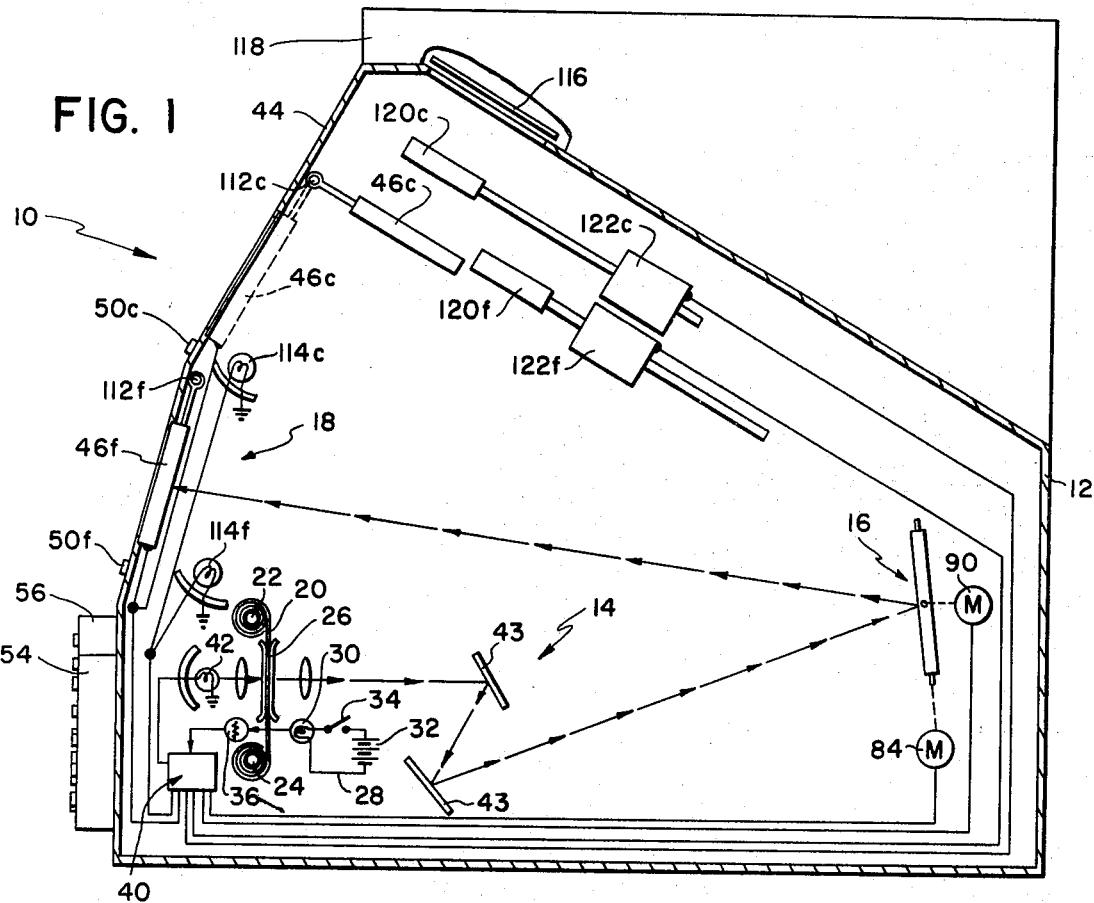
FIG. 1 is a side elevational view, partly in schematic form, of the automatic searching film reader according to this invention.
Figure 2:
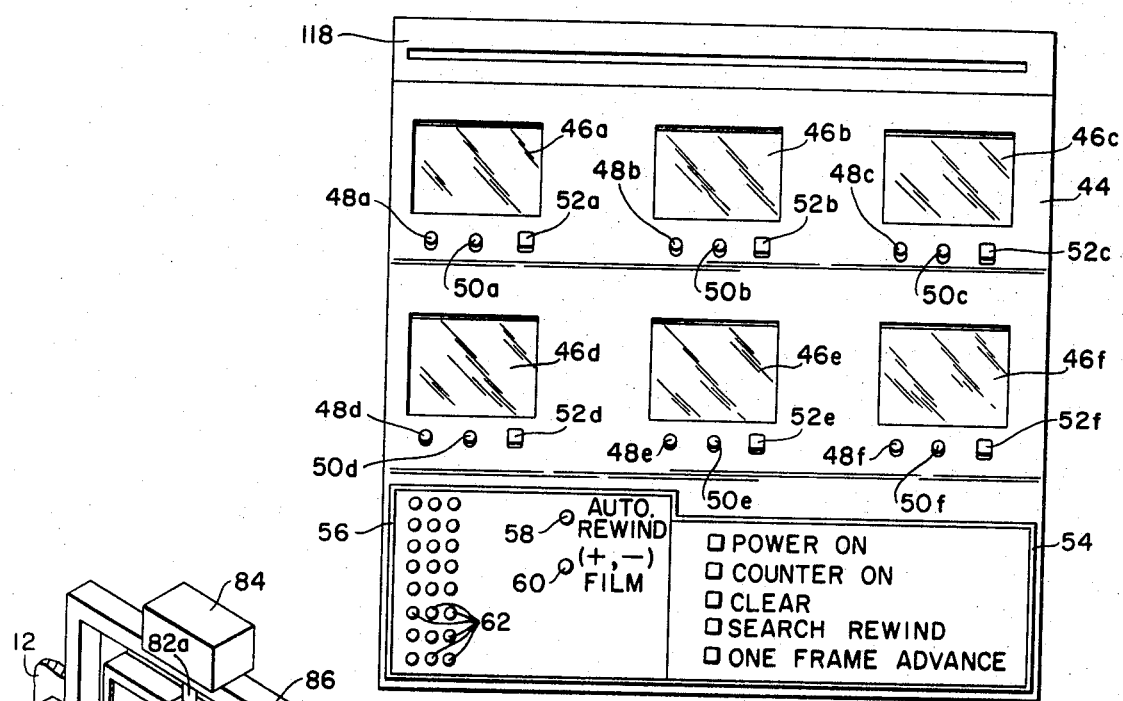
FIG. 2 is a front elevational view of the display panel and control board for the automatic searching film reader of FIG. 1.

Referring now to the drawings, the fundamental structure of the automatic searching film reader 10 according to this invention is best shown in FIGS. 1 and 2. The reader 10 has a housing 12, the interior of which is divided into an information searching section 14, an information transfer section including a multi-positional mirror system 16, and a display and print section 18.

The information searching section 14 includes a moving transient source, such as an information bearing film 20 which may (or may not) contain a number of desired pieces of information to be observed. The film 20 is collected on a driven take-up reel 22 from a supply reel 24 and passes through a film gate 26. Prior to entering the film gate 26, the film passes a scanning device 28, which, in a manner to be explained hereinbelow, determines the existence of a desired piece of information in the same manner as discussed in the heretofore mentioned commonly assigned U.S. Pat. application Ser. No. 276,195, in the name of Homer A. Smith, Jr. The scanning device 28 is described herein only in such detail as to enable a complete understanding of the instant invention. The device 28 includes a lamp 30 powered by a power supply source 32 and controlled by a switch 34. A photoresponsive device 36 located in the optical path of the lamp 30 on the opposite side of the film 20 therefrom receives light signals from the lamp 30 as modulated by the information contained in the film 20. The information bearing film 20 may have any suitable means thereon for identifying the information contained therein and more particularly for identifying the desired information bearing image which is to be retrieved. The signal generated by the photo-responsive device in response to the modulated light pattern received thereby is transmitted to a comparator 38 (see FIG. 3) within a logic arrangement 40. When, as in the manner to be explained hereinbelow, a determination is made that a desired piece of information exists on the film 20, a signal is transmitted to a projection lamp 42 for projecting the detected image toward the multi-positional mirror system 16 through a series of fixed mirrors 43 which are oriented to compensate for the keystoning effect.

The film reader 10 has a front face 44 upon which are spaced a series of photoconductor-liquid crystal display panels 46a–46f. It is, of course, understood that the number of display panels is dependent upon the expected use and desired output of the film reader and is no way limited to the exact number shown. Each of the display panels 46 has a respective print button 48a–48f, an erase button 50a–50f, and an indicating light 52a–52f directly integrated into the logic arrangement 40. The print and erase buttons are for selectively initiating a print cycle for any image stored in a respective display panel or erasing the display within the panel. The indicating lights enable an operator to readily determine whether any particular display panel is available for receiving a desired piece of information.

The front panel 44 has a manual control and override panel 54 with a series of operational buttons for initiating power, setting the stepping switch counter, clearing the individual display panels, initiating search and/or rewind, and advancing the information bearing film at a one-frame-at-a-time rate as desired. Additionally, a keyboard 56 is located adjacent the manual control and override panel 54 and contains an automatic rewind button 58, a positive or negative film selection button 60, and a series of code keys 62. The code keys 62 permit an identification signal to be stored in a memory 63 of the logic arrangement 40, which may then be fed to the comparator 38 to be compared with the signals received from the photoresponsive device 36. If the signal from the photoresponsive device 36 agrees with the signal from the memory 63, a signal representative of a determination of the existence of a desired piece of information to be recorded is generated. This signal is called a "hit" signal and initiates the recording and storing operation as will be explained hereinbelow. The circuitry of the panel 54 and keyboard 56 are of standard format similar to that of aforementioned U.S. Pat. No. 3,290,987 and form no part of the invention described herein.

Figure 4:
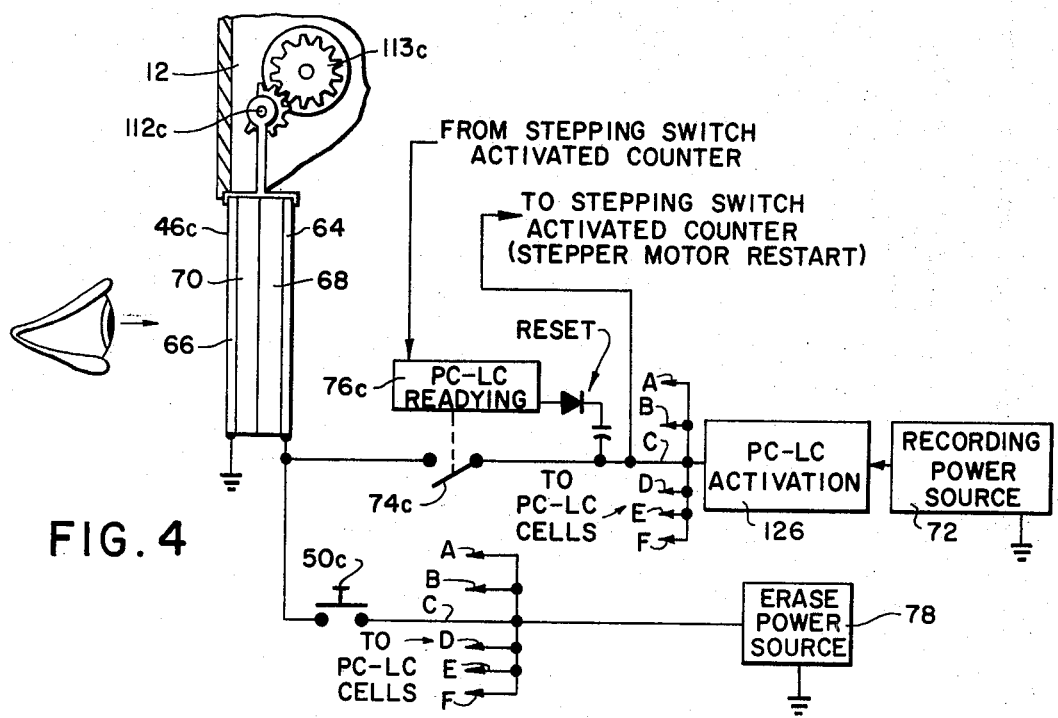
FIG. 4 is a schematic view of the photoconductor-liquid crystal display panel and activating arrangement therefor utilized in the automatic searching film reader of this invention.

Referring now to FIG. 4, a photoconductor-liquid crystal display panel (as for example panel 46c) is shown in greater detail. The display panels may conveniently be of the type shown in U.S. Pat. No. 3,592,527 to Connors et al (if only display is desired) or as that described in U.S. Ser. No. 81,960 to Morse (if both display and copying are necessary) both of which are assigned to the same asignee as this invention. In the preferred embodiment where a print capability is deemed a necessary requirement, the photoconductor-liquid crystal display panel 46c, which is identical to the remaining display panels, has first and second transparent electrodes 64,66 which are spaced apart and have sandwiched therebetween a layer of transparent photoconductor material 68 and a layer of liquid crystal material 70.

In order to enable the panel 46c to record and store a desired image, a d.c. potential is applied between the electrodes 64 and 66 by connecting an activated recording power source 72 through a switch 74c to the transparent electrode 64 (electrode 66 being connected to ground). The switch 74c is controlled by a photoconductor-liquid crystal display panel readying device 76a. The particular photoconductor-liquid crystal display panel (46a, 46b etc.) to be placed in the ready condition by its respective photoconductor-liquid crystal readying device is dependent upon the position of the multi-positional mirror 16. After recording is complete the switch 74c is returned to its open position by the reset circuit 77 which is activated on the negative going pulse of the power source 72. In order to accomplish selective erasure of an image stored in one of the display panels 46a–46f, a high frequency AC power source 78 is connected to the display panels through respective erase buttons 50a–50f.

Figure 5:
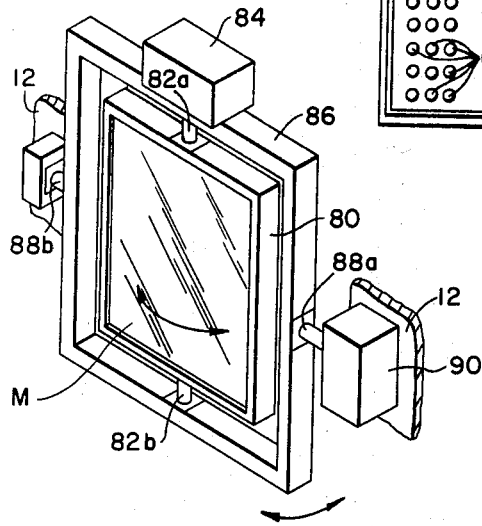
FIG. 5 is an isometric view of the multi-positional mirror utilized in the automatic searching film reader of this invention.

As shown in FIG. 5, the multi-positional mirror system 16 is comprised of a mirror surface M mounted in an inner frame 80 which has a shaft 82 connected thereto. The shaft 82 in turn is connected to a motor 84 which controls rotation of the mirror surface 78 about the shaft 82. The motor 84 is supported by an outer frame 86 to which a segmented shaft 88 is connected. The shaft 88 is in turn connected at one end to a second motor 90 fixed to the housing 12 which controls the position of outer frame 86 (and thus the mirror surface M) about the axis of the shaft 88, the axes of the shafts 88 and 82 being mutually perpendicular. In the six display panel arrangement of this invention, the motor 84 is a three-position motor and the motor 90 is a two-position motor to yield six distinct positions for the mirror system 16, the positions representing orientations of the mirror surface M whereby images projected thereon will be reflected toward respective display panels.

Figure 6:
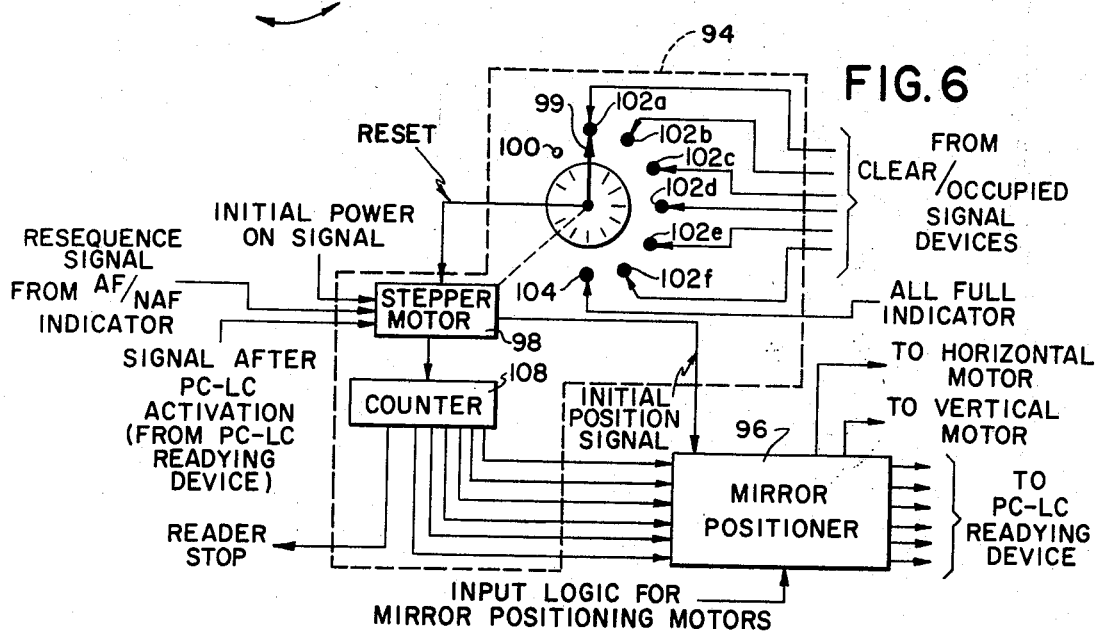
FIG. 6 is a schematic view of the stepping switch actuated counter utilized in the automatic searching film reader of this invention.

The positioning of the multi-positional mirror system 16 is selected so as to record and store a detected desired informational image on the initial photoconductor-liquid crystal display panel to become available for image recording. The ultimate position at any particular time is determined by the position sequencing arrangement shown in FIG. 6, which includes a stepping switch actuated counter 94 and a mirror positioner controller 96. The stepping switch actuated counter 94 includes a drive mechanism having a stepper motor 98 for driving an armature 99 from an initial terminal 100, to terminals 102a through 102f and then to terminal 104 in discrete increments. The terminals 102a–102f are connected to clear/occupied signal devices 106a–106f (see FIG. 3) associated with respective photoconductor-liquid crystal display panel 46a–46f while the terminal 104 provides an "all display panel full" indication. The signal devices 106a–106f indicate the condition of respective display panel 46a–46f; i.e., the signal devices 106a–106f supply an indication signal to the stepping switch actuated counter 94 (and to the indicating lights 52a–52f) of whether a particular display panel is in a condition capable of receiving a desired piece of information to be recorded. The terminals 102a–102f receive a positive value indicating signal when the respective clear/occupied signal devices 106a–106f indicate that a particular panel is clear and thus available for receiving an image which is to be recorded. The provision of the "all display panel full" indicator terminal 104 and, furthermore, the receipt of positive signals at the terminals 102a–102f to indicate a clear state for display panels 46a–46f provides a safety feature in that if a malfunction occurs in the display panel powering system, then no positive signals will be received at the terminals 102a–102f and the armature 100 will be stepped to simulate the condition that all panels are full resulting in the operation of the reader 10 being discontinued.

When the automatic film reader 10 is initially placed in its operative condition (or subsequently after each activation of a photoconductor-liquid crystal display panel 46a–46f) a signal is transmitted to the stepper motor 98 to rotate the armature 99 in discrete increments. The armature 99 will be stepped from terminal 100 in turn to each terminal 102a–102f until it receives a positive signal indicating that a particular display panel is available for receiving an image to be recorded. The stepper motor 98 will simultaneously transmit a signal to a counter 108 to count each discrete step of the armature 100. When the positive signal is received by the armature 99, the stepper motor 98 will be reset so that the armature 99 will be returned to its initial position at terminal 100. At the time when the positive signal is received, the counter 108 will send a signal to the mirror positioner 96 indicative of the number of discrete steps counted as a result of the movement of the armature 99. The mirror positioner 96 will then compare the signal representative of the counted number of discrete steps with a set of input logic instructions which dictate the movement of the multipositional motors 84 and 90 to result in the correct positioning of the mirror system 16 for any particular discrete step count. Since the count is based upon the first positive signal representative of a display panel available for recording, the mirror system 16 will thus be positioned to reflect an image onto the initially available panel.

The mirror positioner 96 also receives a signal from the stepper motor 98 when the stepper motor begins its actuation of the armature 99. This signal will cue the mirror positioner 96 to place the mirror system 16 in an initial position. Therefore, the signals to the motors 84 and 90, based on the count received from the counter 108, will always be based on effecting movement of the mirror 16 from a fixed position. It is, of course, understood that with a considerable increase in the complexity of the logic involved the movement of the motors 84 and 90 may be based on the position of the mirror 16 relative to its previous image directing position.

At the same time the mirror positioner 96 is reading the particular discrete step count number for comparison with the mirror positioning motor input information, a signal will be sent to the appropriate photoconductor-liquid crystal readying device 76a–76f corresponding to the particular discrete step count number received from the counter 108. The appropriate readying device 76a–76f will then close the appropriate switch (e.g. switch 74a of panel 46a) for the initial panel which is available for activation.

If upon activation of the stepper motor 98, the armature 99 is stepped to each of the terminals 102a through 102f in turn and receives no positive signals (this condition being indicative of the fact that each of the photoconductor-liquid crystal display panels 46a–46f has a recorded piece of information thereon) the armature 99 will be stepped to terminal 104 which provides a positive value signal to indicate an "all display panels full" state. When the counter 108 counts a number of steps corresponding to the armature 99 being stepped to the terminal 104, an appropriate signal will be sent to the reader start/stop control 109 through an all full/not all full indicator 110 to stop the further movement of the film 20 through the automatic reader 10. When the "all full" condition signal is detected by the indicator 110, a signal will be sent through an appropriate delay device 111 to initiate resequencing of the stepping switch actuated counter 94. Timed resequencing will continue until a panel becomes available. The availability of a panel is detected by the indicator 111 by a monitoring of the signals to the mirror positioner 96, and when such a signal is detected, a signal is sent to the control 109 to restart the drive for the film 20.

Each of the photoconductor-liquid crystal display panels 46a–46f (of the preferred embodiment where print capability is required) is mounted for pivotable movement about the axes 112a–112f respectively, between an observation position adjacent the front panel 44 of the housing 12 and a printing position within the housing 12 by means of appropriate drive mechanisms 113a–113f. Each of the display panels 46a–46f has an associated printing lamp 114a–114f to selectively project the image stored in the respective display panel if so desired onto a photosensitive surface 116 of a photocopier 118, the photocopier 118 being of any convenient type (not forming part of this invention). The projection of the desired image onto the photosensitive surface 116 is accomplished through appropriate lens and mirror systems 120a–120f which are movable into the optical path of the respective projected image by drive mechanisms 122a–122f. As seen in FIG. 3, the logic arrangement 40 includes a print control 124 which, in response to a signal from a print button 48a–48 f, will activate an appropriate panel drive mechanism 113a–113f and optics drive mechanism 122a–122f to move a selected display panel and respective lens and mirror system into operative relation to accomplish desired printing.

With the apparatus thus described, the operation of the logic arrangement 40 to accomplish the recording and storing of desired information from a moving transient source such as the film 20 will now be described with particular reference to FIG. 3. A set of parameters from keyboard 56 is placed in the memory 63 of the logic arrangement 40, the selected parameters being, in turn, fed to the comparator 38. The parameters supplied to the memory 63 are dependent upon the mechanism used to determine the existence of the desired source within the transient stream which may or may not contain one or more elements of the desired source as fully described in the aforementioned U.S. Pat. application Ser. No. 276,195. In the instant embodiment, where there is to be accomplished the reading of a moving strip of film 20, the parameters fed to the memory 63 are preferably based on a code of light patterns which indicate the existance of a particular desired piece (or pieces) of information which may be contained in the film 20. After the code parameters are set, the reader 10 is energized by the appropriate switch on the manual control and override panel 54 so that the film drive control start/stop 109 will cause drive spool 22 to be driven to move the film 20 through the detection system 28, and the detection system 28 will be energized.

At the same time the reader 10 is energized, a signal is sent to the stepping switch actuated counter 94 which will initiate a sequencing cycle of the stepper motor 98 to rotate the armature 99 and transmit a signal to the mirror positioner 96 to actuate motors 84 and 90 according to the input logic to move mirror system 16 to its initial position. Since in the starting condition no images are present on any of the photoconductor-liquid crystal display panels 46a–46f, a positive signal will exist at the terminal 102a indicating that the panel 46a is available for receiving an image of a desired piece of information. The counter will have counted that the armature 99 moved one discrete step and will send the appropriate signal to the mirror positioner 96 which, according to the input logic, will actuate the motors 84 and 90 so that the mirror system 16 will be positioned to reflect any image directed thereto onto the photoconductor-liquid crystal display panel 46a. Substantially simultaneously, the photoconductor-liquid crystal readying device 76a will be activated to close the switch 74a to the panel 46a so that the panel is in a state capable of having a voltage applied across the electrodes 64 and 66 thereof in order that any image formed thereon may be recorded and stored in the liquid-crystal layer 70.

As the film 20 is scanned by the detection system 28, signals are fed to the comparator 38 indicative of the information existing on the film 20. When a particular signal as received by the comparator 38 coincides with the signal stored in the memory 63 to indicate that a desired piece of information has been determined to exist, a signal will be emitted from the comparator 38. This signal, called a "hit" signal, is relayed simultaneously to a projection light source 42 and a photoconductor-liquid crystal activation means 126. When the signal is received at the projection light source 42, the projection light source will begin timed operation to illuminate the object at the correct moment that the desired information appears in the film gate 26, without necessitating the slowing down of the film 20. This desired information will be projected onto the multipositional mirror system 16 which is in position to redirect it onto the display panel 46a for forming an image thereof on the panel. The display panel 46a is at that time in its recording and viewing position adjacent the front panel 44 of the housing 12.

The "hit" signal, as noted above, is simultaneously received at the activation means 126 which will permit the power source 72 to provide timed enabling potential for all of the display panels 46a–46f. However, since only the panel 46a has been placed in a ready position by closing of its readying switch 74a, this panel is the only one capable of having the potential applied across the electrodes thereof for recording and storing the image from the moving film 20. With the potential being applied across the electrodes and an image being projected by the projection lamp 42, as reflected from the mirror system 16, the desired image will be recorded on display panel 46a. The application of potential across the electrodes will cause a signal to be sent to the clear/occupied indication signal device 106a to indicate that the panel 46a has changed to the occupied state. The signal device 106a will then transmit this information to the stepping switch actuated counter 94 by removing the positive signal from the terminal 102a. When the activation means 126 has reached the end of its timed cycle and interrupted power supply to the display panel 46a, the negative going pulse will reset the switch 74a to its open position to insure that the panel cannot be inadvertently imaged.

At the time the activation means 126 permits the power source 72 to activate the panel 46a, a delayed signal will be sent to the stepping switch actuated counter 94 to initiate drive of the stepper motor 98, to move the armature 99 for a determination of the next available display panel which may be imaged, and to reset the mirror system 16 to its initial position. The built-in delay for initiating drive of the stepper motor 98 is for a time only sufficient to insure the recording of the image on the previously available panel. At the point in time so far developed with only the panel 46a being occupied by an image, the next available panel will be 46b and accordingly the armature 99 will receive a positive signal at terminal 102b. The counter 108 will count the discrete steps to terminal 102b and send the appropriate signals to the mirror positioner 96 to determine the proper movement of motors 84 and 90 to adjust the position of the mirror system 16 so that an image projected thereon will be reflected to the panel 46b. As soon as the next "hit" signal is received, the above process will be repeated with the stepping switch actuated counter 94 each time determining which of the particular panels 46a–46f is available for recording and storing the desired piece of information.

Depending upon the particular nature of the information being recorded in each of the display panels 46a–46f, an operator may wish to observe each of the panels in turn and decide whether the image stored therein should be retained for observation or printed by means of the photocopier 118 or may be immediately erased. If the image may be erased, the appropriate button 50a–50f may be pushed and the respective display panel will have a high frequency potential from the high frequency potential source 78 applied across the electrodes thereof to erase the image stored therein. The application of image erasure potential will cause a signal to be transmitted to the appropriate clear/occupied signal device 106a–106f to change its state to indicate the panel is clear so that the signal device may in turn send an appropriate positive signal to its respective terminal 102a–102f in order to correctly inform the stepping switch actuated counter 94 of the availability of that particular display panel for reimaging.

If the image within the display panel is determined to be of such a nature that it should be retained for observation, the operator will do nothing with regard to that display panel and the stepping switch actuated counter 94 will automatically continue to avoid imposing another image on that particular panel until such time as an indication is received by the counter 94 that the image within the particular panel has been erased. If the operator decides that a print of any retained image is necessary, the appropriate print button 48a–48f will be pressed and the print control 124 will insure that the appropriate panel will be pivoted to its printing position and the corresponding lens-mirror system will be inserted in the optical path. The associated print lamp 114a–114f will then project the image within the panel through the lens-mirror system to form an image thereof on the photosensitive surface 116 of the photocopier 118 to permit a copy thereof to be made. Once a print is made, the image within the panel may be erased in the manner described above and the appropriate signal indicating that the panel is clear and available for reimaging will be transmitted to the stepping switch actuated counter 94.

Any particular filmstrip being read may contain any number of desired information images to be recorded. The logic arrangement 40 will insure that each of the desired pieces of information as indicated by the "hit" signals are recorded on the first available photoconductor-liquid crystal display panel available for recording and storage. The receipt of the "hit" signal which results in all panels being in the occupied state will also result in the stepper motor 98 driving the armature 99 to terminal 104 to indicate that the "all display panels full" condition has been reached. As noted above, at this particular count, an all full indicating signal will be sent to the indicator 110 which in turn sends a signal to the film drive stop/start 109 to stop the drive of the film 20 and a time delayed signal is sent to the stepping switch actuated counter 94 to cause recycling thereof. Time delayed recycling will occur until a display panel becomes available, which condition is monitored to produce a signal which restarts the film drive to enable image recording to recommence.

From the foregoing it is apparent that there is herein provided a novel apparatus for rapidly recording on a series of photoconductor-liquid crystal display panels a number of pieces of information taken from a moving stream which may contain any number of desired pieces of information. Each piece of information is recorded in turn on the initial available display panel so that the moving stream of information need not be interrupted. The stored images from the moving stream may be retained for subsequent observation and/or comparison to determine whether a copy of the desired piece of information need be made.

The invention has been described in detail with reference to preferred embodiments thereof, but it will be understood that variations and modifications can be effected within the spirit and scope of the invention.

I claim:

1. An apparatus for recording and storing a series of desired images from a transient source of information, said apparatus comprising:
    means for observing said transient source of information and determining the existence of desired images therein;
    a series of photoconductor-liquid crystal display panels selectively activatable to record and store images projected thereon; and
    means for projecting each determined desired information image in turn onto a particular activated photoconductor-liquid crystal display panel for recording thereon without interrupting the transient source of information.

2. The apparatus of claim 1, wherein the transient source of information is a moving strip of film having a series of information images and a coding system to identify each of said images and wherein said observation means includes a scanning device for detecting said coding system as associated with each information image in the strip of film and a comparator device for comparing the detected image coding with a known coding of a desired information image and producing a signal when said detected image coding and said known coding are in agreement.

3. The apparatus of claim 2, wherein each of said photoconductor-liquid crystal display panels in said series of display panels includes a layered structure having in order: a first transparent electrode, a layer of photoconductor material in contiguous relation with said first transparent electrode, a layer of liquid crystal material in contiguous relation with said photoconductor material, and a second transparent electrode in contiguous relation with said liquid crystal material; and a power source for supplying a potential between said transparent electrodes to activate said display panel to render it effective to record and store an image projected thereon, and wherein each of said photoconductor-liquid crystal display panels in said series further includes readying means for placing the display panel in a condition in which it may be activated.

4. The apparatus of claim 3, wherein the liquid crystal material of said photoconductor-liquid crystal display panel is comprised of a combination of nematic liquid crystal material and cholesteric liquid material so as to permit said display panel to store the image recorded thereon.

5. The apparatus of claim 4, further including an A.C. power source selectively and independently connectable to each of said photoconductor-liquid crystal display panels for applying an A.C. potential between the transparent electrodes thereof, said potential being of such a frequency as to effect erasing of an image stored in said display panel.

6. The apparatus of claim 2, wherein said means for projecting each determined desired information image includes a projection radiation source, activating means responsive to said signal from said comparator device for selectively activating said projection radiation source when each desired information image is detected by said comparator device, and a multipositional mirror system positionable so as to selectively provide a projection path between said projection radiation source and each of said series of photoconductor-liquid crystal display panels.

7. The apparatus of claim 6, wherein said multipositional mirror system includes positioning means for adjusting the position of said mirror system about two perpendicular axes thereof; and wherein said means for projecting each determined desired information image further includes a logic arrangement for controlling the activation of said positioning means to position said multi-positional mirror system in relation to a particular display panel of said series of photoconductor-liquid crystal display panels so as to permit a determined desired information image to be projected onto said panel, said logic means further controlling said readying means so as to activate the corresponding panel toward which the information image is directed by said multi-positional mirror.

* * * * *